UNITED STATES PATENT OFFICE.

JOHN T. ADAMS, OF BELLAIRE, OHIO.

BATCH FOR MAKING GLASS.

SPECIFICATION forming part of Letters Patent No. 360,840, dated April 12, 1887.

Application filed May 20, 1886. Serial No. 202,758. (No specimens.)

*To all whom it may concern:*

Be it known that I, JOHN T. ADAMS, of Bellaire, in the county of Belmont and State of Ohio, have invented a new and useful Improvement in Batches for Making Glass; and I do hereby declare the following to be a full, clear, and exact description thereof.

My invention relates to the composition of an improved batch for the manufacture of glass, in which the sulphate of soda is used; and it consists, mainly, in forming the same in part of coal or sawdust.

The composition of the batch as ordinarily used by me consists of sand, one hundred parts; sulphate of soda, forty parts; ground limestone, thirty-five parts, or burnt lime, twenty-seven parts; arsenic, two parts; coal, three parts. The coal used may be either bituminous or anthracite; but I prefer the former. Sawdust may be used instead of coal, and while not so good, in my opinion, is still an equivalent of the coal, and as such I wish it to be understood as included under the head of coal used in the claims. These ingredients are all mixed together to form the batch before it is put into the melting pot or hearth. The effect of the coal or sawdust is to produce a prolonged ebullition, caused by the driving off of the volatile matters, and this tends to clarify the bath. Moreover, the action of binoxide of manganese contained in the coal is to counteract the effect of the oxide of iron which exists as an impurity in the other ingredients.

I do not limit myself to the exact proportions of the batch given, nor to the particular batch so far as the coal is concerned.

I am aware that charcoal and coke have been used as ingredients in glass batches. My invention differs from this, however, in that I employ coal, sawdust, or similar substances containing volatile hydrocarbons, which, under the action of heat, are converted into gases and produce the ebullition in the batch, which it is the purpose of my invention to secure.

What I claim as my invention, and desire to secure to secure by Letters Patent, is—

1. A glass batch composed partly of a substance containing volatile hydrocarbon, substantially as and for the purposes described.

2. A glass batch composed of sand, sulphate of soda, lime, arsenic, and a substance containing volatile hydrocarbon, substantially as and for the purposes described.

In testimony whereof I have hereunto set my hand this 8th day of May, A. D. 1886.

JOHN T. ADAMS.

Witnesses:
R. H. WHITTLESEY,
THOMAS W. BAKEWELL.